(12) United States Patent
Zhang (10) Patent No.: US 11,816,431 B2
(45) Date of Patent: Nov. 14, 2023

(54) AUTOCOMPLETE OF USER ENTERED TEXT

(71) Applicant: salesforce.com, inc., San Francisco, CA (US)

(72) Inventor: Yang Zhang, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 136 days.

(21) Appl. No.: 16/846,338

(22) Filed: Apr. 12, 2020

(65) Prior Publication Data

US 2021/0319178 A1 Oct. 14, 2021

(51) Int. Cl.
*G06F 40/274* (2020.01)
*G06F 40/30* (2020.01)
*G06N 3/088* (2023.01)

(52) U.S. Cl.
CPC ............ *G06F 40/274* (2020.01); *G06F 40/30* (2020.01); *G06N 3/088* (2013.01)

(58) Field of Classification Search
CPC ........ G06F 40/274; G06F 40/30; G06N 3/088
See application file for complete search history.

(56) References Cited

U.S. PATENT DOCUMENTS

| | | | |
|---|---|---|---|
| 2013/0019320 A1* | 1/2013 | Ericsson | G06F 21/10 726/28 |
| 2017/0024392 A1* | 1/2017 | Shah | G06N 7/00 |
| 2017/0277737 A1* | 9/2017 | Singh | G06F 16/2246 |
| 2017/0277770 A1* | 9/2017 | Singh | G06F 16/90324 |
| 2017/0351951 A1* | 12/2017 | Santos | G06N 3/08 |
| 2018/0300407 A1* | 10/2018 | Wolny | G06N 5/04 |
| 2020/0125635 A1* | 4/2020 | Nuolf | G06N 20/20 |
| 2021/0365806 A1* | 11/2021 | Sumanth | G06F 16/24575 |

* cited by examiner

*Primary Examiner* — Michael N Opsasnick
(74) *Attorney, Agent, or Firm* — Butzel Long (57) ABSTRACT

Computer implemented method and a system for auto completion of text based on the context associated with the text. The computer implemented method includes steps of receiving input text, identifying a certain context associated with the input text from multiple predefined contexts, by feeding the input text into a context-prediction component of a machine learning model that predicts the certain context, selecting a certain context-specific component of the machine learning model from multiple context-specific components according to the identified certain context, feeding the input text into the selected context-specific component that outputs autocomplete text associated with the identified certain context. The context-specific components are each trained to generate autocompleted text associated with a respective context pre-defined for the respective context-specific component.

15 Claims, 5 Drawing Sheets

AUTOCOMPLETE OF USER ENTERED TEXT

BACKGROUND

Some embodiments relate to autocomplete and, more specifically, but not exclusively, to systems and methods for autocomplete of user entered text.

Autocomplete is a software feature that predicts the rest of a word, sentence, or paragraph a user is typing. Autocomplete helps speed up writing by a user, by predicting what the user will be typing, and automatically completing remaining text rather than the user typing the rest of the text out.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

According to a first aspect, a computer implemented method of context based autocomplete of text, comprises: receiving input text, feeding the input text into a context-prediction component of a machine learning model that predicts a certain context of a plurality of contexts, selecting a certain context-specific component of the machine learning model from a plurality of context-specific components according to the certain context, feeding the input text into the selected context-specific component that outputs autocomplete text, and providing the autocomplete text.

According to a second aspect, a computer implemented method of training a machine learning model for context based autocomplete of text, comprises: training a context-prediction component of the machine learning model for predicting a certain context of a plurality of contexts, when fed input text, training a plurality of context-specific components of the machine learning model, each respective context-specific component is trained for a corresponding respective context of the plurality of contexts, for outputting autocomplete text when fed the input text, and providing the model for outputting autocomplete text when fed input text.

According to a third aspect, a system for context based autocomplete of text, comprises: at least one hardware processor executing a code for: receiving input text, feeding the input text into a context-prediction component of a machine learning model that predicts a certain context of a plurality of contexts, selecting a certain context-specific component of the machine learning model from a plurality of context-specific components according to the certain context, feeding the input text into the selected context-specific component that outputs autocomplete text, and providing the autocomplete text.

In a further implementation form of the first aspect, further comprising: extracting embeddings from the context-prediction component of the machine learning model fed the input text, mapping the embeddings to one of a plurality of clusters, each respective cluster denoting one respective context of the plurality of contexts, wherein the certain context is predicted according to the respective cluster.

In a further implementation form of the first aspect, the context-prediction component is implemented as a neural network, wherein the embeddings are represented as a vector and extracted as hidden states from internal layers of the neural network, wherein each of the plurality of clusters is defined as points within a multidimensional space, and the certain context is predicted according to the cluster that has a shortest distance to the vector representation of the input text.

In a further implementation form of the first aspect, the embeddings are mapped to one of the plurality of clusters by a clustering model that is trained using an unsupervised approach.

In a further implementation form of the first aspect, the receiving, feeding the text into the context-prediction component, the selecting, the feeding the text into the selected context-specific component, and the providing, are dynamically iterated for additional received text, wherein the context is dynamically adapted according to the additional received text.

In a further implementation form of the first aspect, when the context-prediction component predicts at least two different contexts of the plurality of contexts, at least two context-specific components are selected according to the at least two different contexts, the input text is fed into each one of the at least two different context-specific components that output respective autocomplete text, and at two different autocomplete texts outputted by the context-specific components are presented on a display for selection of one of the at least two different autocomplete texts for completion of the input text.

In a further implementation form of the second aspect, further comprising:

receiving a plurality of text elements, each text element associated with a label of a certain context of the plurality of contexts, and training a language model on the plurality of text elements and associated labels, wherein the language model is used for the context-prediction component.

In a further implementation form of the second aspect, the language model comprises a pre-trained generic language model trained on generic text that is unlabeled with an indication of context, and the language model is trained by fine tuning the pre-trained generic language model on the plurality of text elements and associated labels indicative of context.

In a further implementation form of the second aspect, further comprising using embeddings of the language model to create a clustering model for predicting clusters using an unsupervised approach that learns to cluster the embeddings, wherein each cluster indicates a respective context of the plurality of contexts, and using the cluster model for the context-prediction component.

In a further implementation form of the second aspect, further comprising: receiving a plurality of text elements, each text element associated with a label of a certain context of the plurality of contexts, and wherein training each respective context-specific component of the plurality of context-specific components is performed using text elements associated with the label of the respective context corresponding to the respective context-specific component.

In a further implementation form of the second aspect, each respective context-specific component of the plurality of context-specific components is trained by fine tuning a common pre-trained generic language model trained on generic text, with respective text elements associated with the label of the respective context corresponding to the respective context-specific component.

In a further implementation form of the second aspect, the plurality of text elements are semi-structured metadata, and the labels are automatically extracted from the semi-structured metadata using a label extraction machine learning model trained on a training dataset of text and associated labels.

In a further implementation form of the third aspect, the at least one hardware processor further executes a code for: training the context-prediction component of the machine learning model for predicting the certain context of a plurality of contexts, when fed input text, and training the plurality of context-specific components of the machine learning model, each respective context-specific component is trained for a corresponding respective context of the plurality of contexts, for outputting autocomplete text when fed the input text.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to autocomplete and, more specifically, but not exclusively, to systems and methods for autocomplete of user entered text.

An aspect of some embodiments of the systems, methods, apparatus, and/or code instructions (stored on a memory and executable by one or more hardware processors) relate to context based autocomplete of text. The context may be, for example, a topic category, a profession field, and a domain (e.g., knowledge domain). The input text is manually entered by a user, for example, typed using a keyboard. The input text is fed into a context-prediction component of a trained machine learning model (sometimes referred to herein as "model") that predicts a certain context of a multiple candidate contexts, for example, hobbies, health, business, and technology field. Each candidate context is mapped to a corresponding context-specific component of the machine learning model. A certain context-specific component of the machine learning model is selected from the multiple candidate context-specific components according to the certain context outputted by the context-prediction component. The input text is fed into the selected context-specific component, which outputs the autocomplete text. The autocomplete text is provided, for example, presented as a possible completion of the input text.

An aspect of some embodiments of the systems, methods, apparatus, and/or code instructions (stored on a memory and executable by one or more hardware processors) relate to training a machine learning model for context based autocomplete of text. A context-prediction component of the machine learning model is trained for predicting a certain context of multiple candidate contexts, in response to input text fed into the context-prediction component. Multiple context-specific components of the machine learning model are trained. Each respective context-specific component is trained for a corresponding respective context of the multiple candidate of contexts. Each candidate context that may be outputted by the context-prediction component of the machine learning model maps to one corresponding trained context-specific component. Each trained context-specific component outputs autocomplete text when fed the input text. The autocomplete text generated by each respective trained context-specific component is within the corresponding certain. For example, when the context-prediction component outputs "medical" as the context, the trained context-specific component corresponding to the context "medical" outputs autocomplete text that is within the context "medical". The trained model is provided for outputting autocomplete text when fed input text.

At least some implementations of the systems, methods, apparatus, and/or code instructions described herein address the technical problem of improving accuracy of an autocomplete feature. At least some implementations of the systems, methods, apparatus, and/or code instructions described herein improve the technology of the autocomplete feature. Existing autocomplete tools are generic in nature. The generic autocomplete tools are created by training of generic text datasets, which are usually from a different domain than the domain the user is writing in, for example depending on industry, organization, target audience, publication type, and/or user interest. When the user is creating text based content in a particular domain, the generic autocomplete tools generally provide generic autocomplete of the sentences, which are incorrect, inaccurate, and/or irrelevant for the particular domain, for example, have a completely different meaning than what the user actually intended. Moreover, even within the same piece of text being written, different part of the text may refer to different context and/or different domain. In such cases, a generic autocomplete cannot adapt to the changes in context and/or domain, leading to erroneous, incorrect, and/or irrelevant autocomplete. When the autocomplete is incorrect, the amount of time required from the user may actually increase over not using the autocomplete at all, for example, the user is required to constantly double check and correct the autocomplete, above and beyond the basic writing of the text.

At least some implementations of the systems, methods, apparatus, and/or code instructions described herein provide a technical solution to the above mentioned technical problem and/or improve the technical field of autocomplete, by predicting the text for autocomplete based on the context and/or domain of the text that was written by the user. The text is analyzed, optionally dynamically, to detect the context and/or domain. The autocomplete is done by a model that is trained on data for the identified context and/or domain. The autocomplete is made according to the identified context and/or domain, providing more accurate and/or relevant text. The autocomplete may be dynamically adapted for different context and/or domain, as the user is writing, for example, even within the same paragraph.

For example, for the following text "In this section, we will introduce Bert", a generic language generative model generated using existing approaches may generate the following incorrect and/or irrelevant result "a Muppet character on Sesame Street". In contrast, the context-based generative model trained on context relevant data, as described herein, may generate the following context related autocomplete data, which is correct and/or relevant to the context of the text "Pre-training of Deep Bidirectional Transformers for NLP tasks".

In another example for the following text "To better utilize custom feedback, the manager", the generic language generative model may generate the following incorrect and/or irrelevant result "works alongside their company's executive team in communicating and sharing important customer insights with the sales team". In contrast, the context-based generative model trained on context relevant data, as described herein, may generate the following context related autocomplete data, which is correct and/or relevant to the context of the text "suggests a new feature called LSTM to capture the best feature from the context".

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
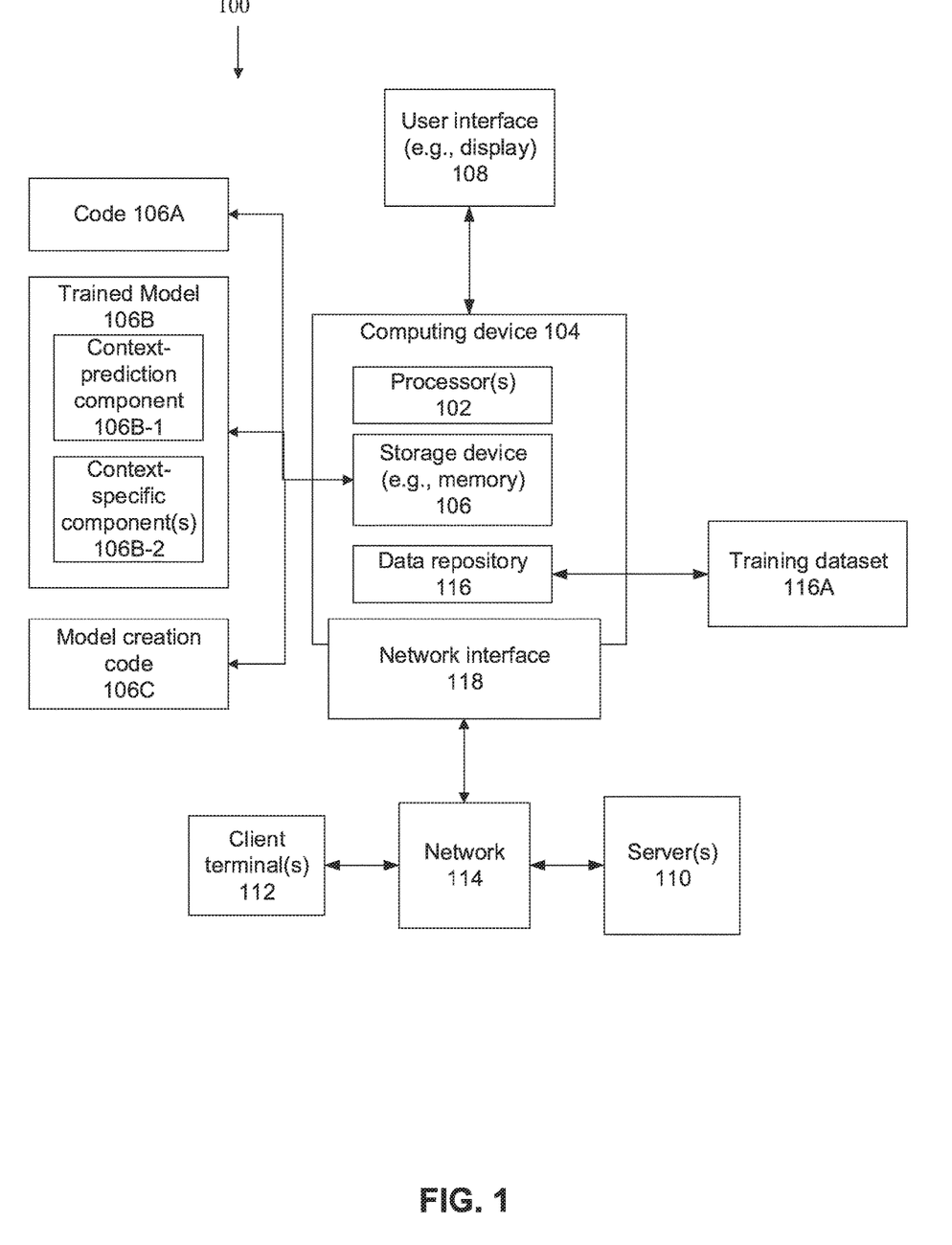
FIG. 1 is a block diagram of a system for training a model for context-based autocomplete and/or for autocomplete of text using the model trained for context-based autocomplete, in accordance with some embodiments.
Figure 2:
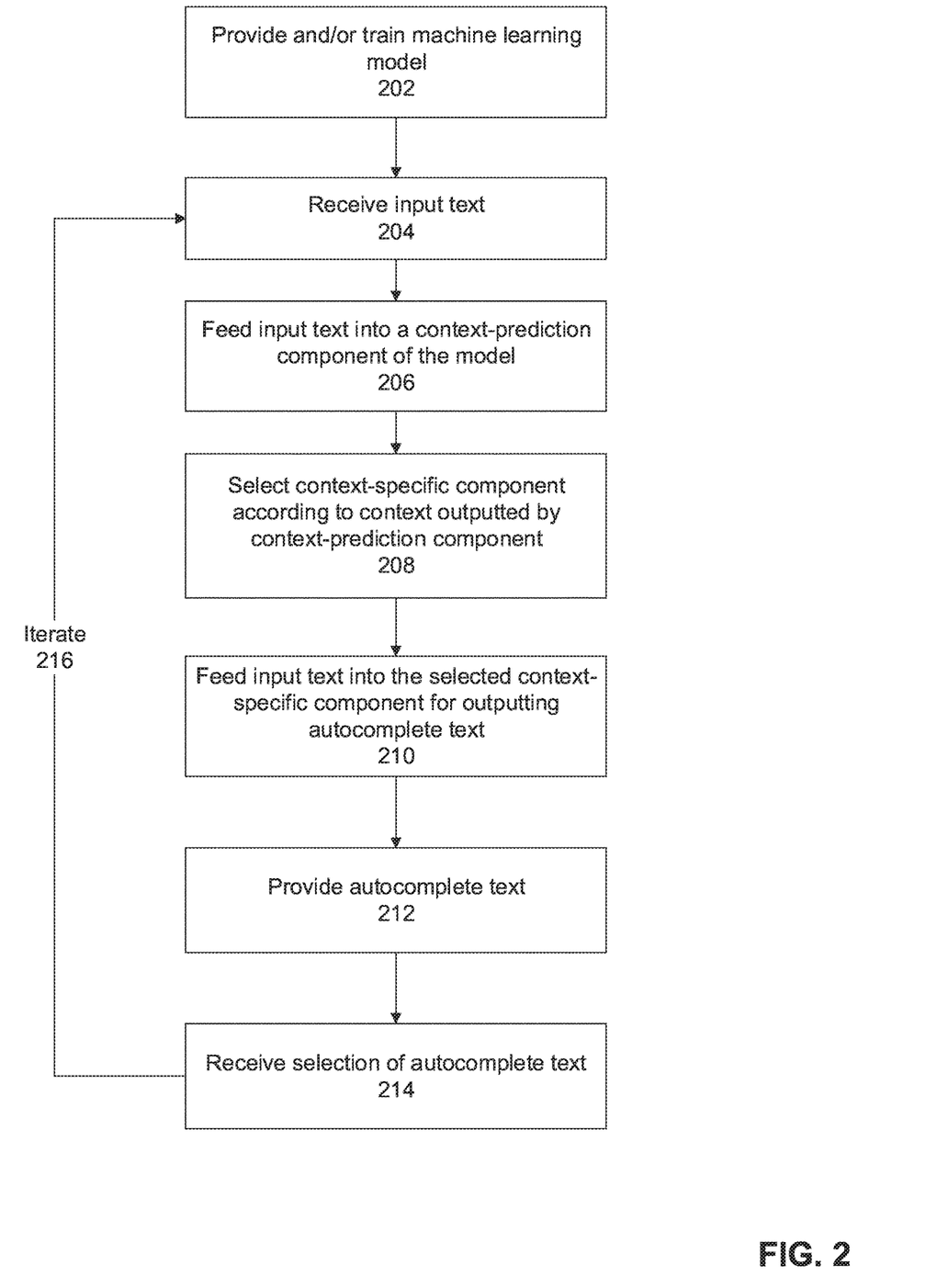
FIG. 2 is a flowchart of a method for autocomplete of text using a model trained for context-based autocomplete, in accordance with some embodiments.
Figure 3:
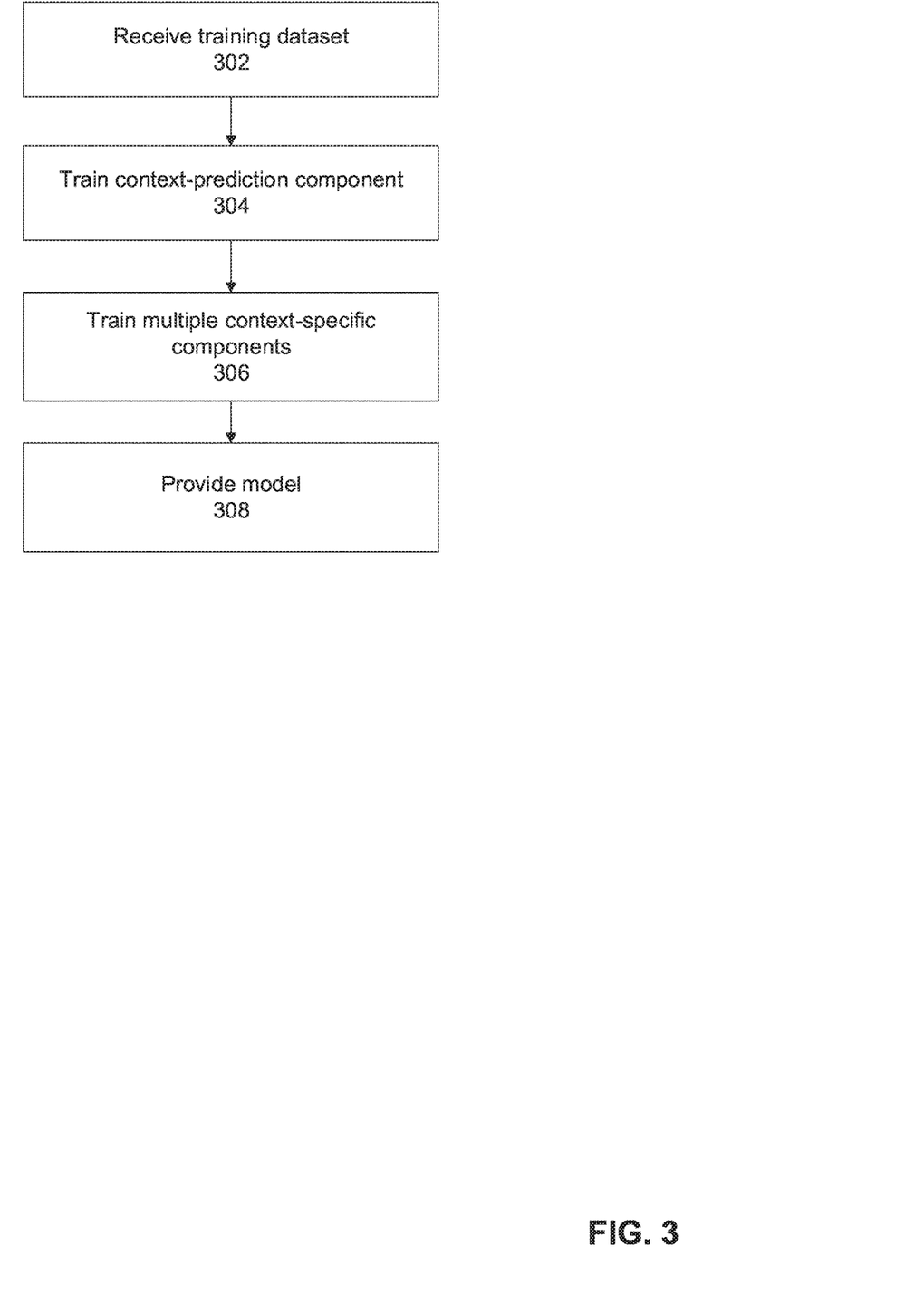
FIG. 3 is a flowchart of a method for training the model for context-based autocomplete, in accordance with some embodiments.
Figure 4:
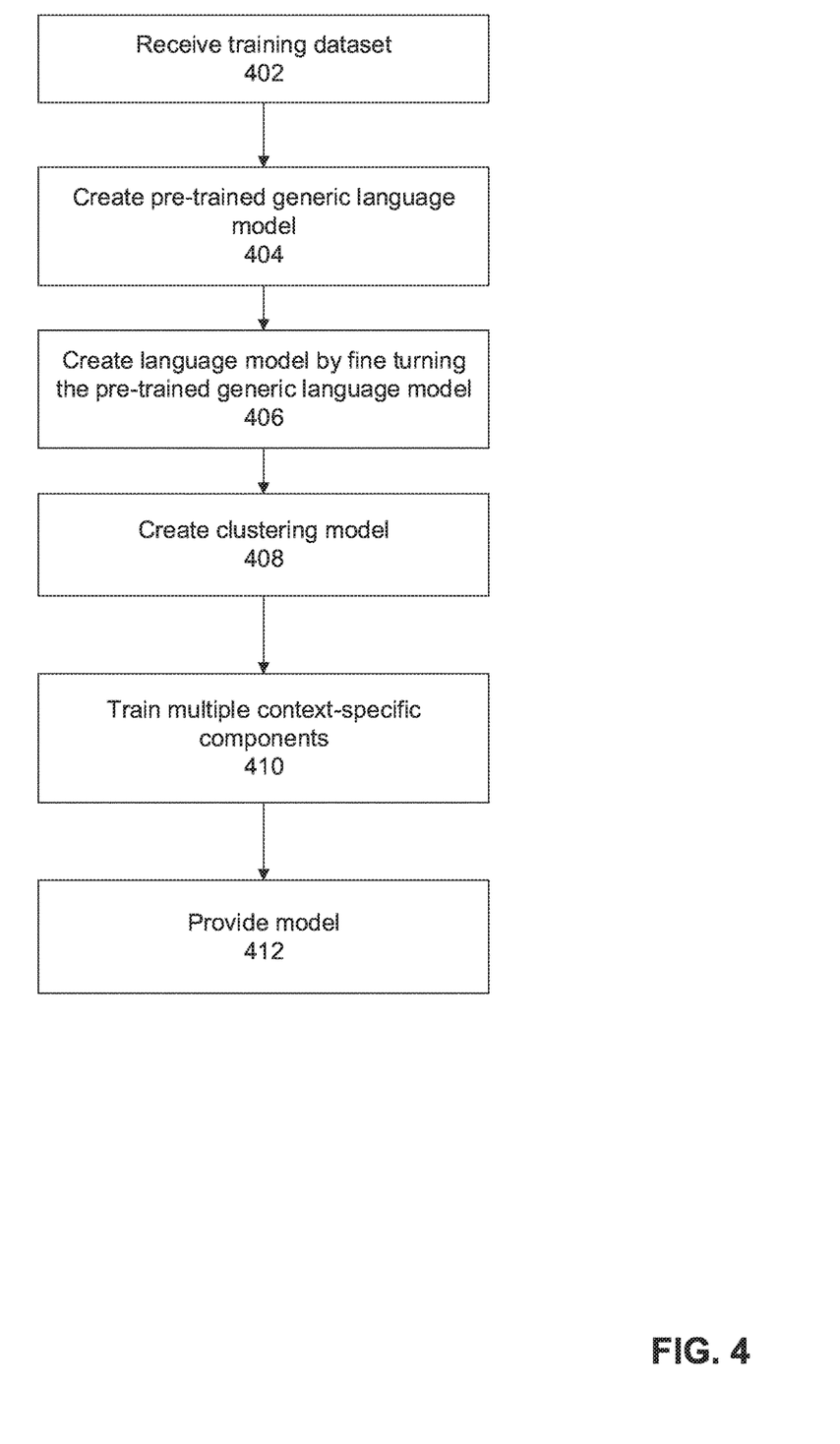
FIG. 4 is a flowchart of an exemplary method for training the model for context-based autocomplete, in accordance with some embodiments.

Reference is now made to FIG. 1, which is a block diagram of a system 100 for training a model for context-based autocomplete and/or for autocomplete of text using the model trained for context-based autocomplete, in accordance with some embodiments. Reference is also made to FIG. 2, which is a flowchart of a method for autocomplete of text using a model trained for context-based autocomplete, in accordance with some embodiments. Reference is also made to FIG. 3, which is a flowchart of a method for training the model for context-based autocomplete, in accordance with some embodiments. Reference is also made to FIG. 4, which is a flowchart of an exemplary method for training the model for context-based autocomplete, in accordance with some embodiments. The method described with reference to FIG. 4 may be an exemplary implementation of the method described with reference to FIG. 3. System 100 may implement the acts of the method described with reference to FIGS. 2-4, by processor(s) 102 of a computing device 104 executing code instructions 106A and/or 106B and/or 106C stored in a storage device 106 (also referred to as a memory and/or program store).

Trained model 106B includes context-prediction component 106B-1 and/or context-specific component 106B-2, as described herein. It is noted that context-prediction component 106B-1 and context-specific component 106B-2 may be implemented independently, for example, executing on two or more different devices (e.g., context-prediction component 106B-1 is centrally stored and executed by computing device 104, and multiple context-specific components 106B-2 may be locally stored and executed by respective multiple client terminals 112 and/or servers 110). In another example, context-prediction component 106B-1 and context-specific component 106B-2 may be implemented together, for example, stored and executed by the same device, such as computing device 104.

It is noted that the systems, methods, apparatus, and/or code instructions described herein may be implemented for use with any language. English is used herein as a not necessarily limiting example.

Computing device 104 may be implemented as, for example, a client terminal, a server, a computing cloud, a virtual server, a virtual machine, a mobile device, a desktop computer, a thin client, a Smartphone, a Tablet computer, a laptop computer, a wearable computer, glasses computer, and a watch computer.

Multiple architectures of system 100 based on computing device 104 may be implemented. In an exemplary implementation, computing device 104 storing code 106A and/or 106B and/or 106C, may be implemented as one or more servers (e.g., network server, web server, a computing cloud, a virtual server) that provides services (e.g., one or more of the acts described with reference to FIG. 2-4) to one or more client terminals 112 over a network 114, for example, providing software as a service (SaaS) to the client terminal(s) 112, providing software services accessible using a software interface (e.g., application programming interface (API), software development king (SDK)), providing an application for local download to the client terminal(s) 112, and/or providing functions using a remote access session to the client terminals 112, such as through a web browser. For example, users use their locally installed client terminals 112 to access computing device 104, which may be remotely located. The users may provide entered text to computing device 104, which performs the autocomplete feature as described with herein with reference to FIG. 2, and provides the output back to the respective client terminal for presentation on a display. For example, the user is accessing computing device 104 to use the autocomplete function for assistance with writing text for a certain context. In another example, the connection from client terminal 112 to computing device 104 may be via a local application running on client terminal 112 that accesses the software interface to computing device 104. For example, the user is typing text into a certain application, for example, for creating training materials. The application sends the text via the software interface to computing device 104, and receives autocomplete text from computing device 104 via the software interface. The application presents the autocomplete on the display of the client terminal, optionally within the application itself. In another example, server(s) 110 run applications which are remotely accessed by client terminals 112 over network 114, for example, a social network hosted by a social network server where the user is typing content for updating their social profile page. The applications on server(s) 110 provide the text entered by client terminals 112 to computing device 104 via the software interface. The autocomplete is provided by computing device 104 to server(s) 110 via the software interface. The applications running on server(s) 110 may present the autocomplete on the display of the client terminals 112. In another example, computing device 104 may include locally stored software (e.g., code 106A and/or 106B and/or 106C) that performs one or more of the acts described with reference to FIGS. 2-4, for example, as a self-contained client terminal. For example, a kiosk that includes a graphical user interface (GUI) to help a user design greeting cards which are then printed. The text used by the user into the GUI is autocompleted using the locally installed software according to the context of the text being entered by the user, for example, wedding, anniversary, birthday, and graduation.

In yet another example, the training of the model (e.g., using code 106C) is performed by one server, and the use of the trained model (e.g., code 106A and/or trained model 106B) is performed by a different server (that obtains the trained model 106B from the first server and/or accesses the first server to use the trained model 106B), where the two servers communicated with one another over network 114. In yet another example, training of model 106B is centrally performed by computing device 104. Context-prediction-component 106B-1 may be centrally stored and/or executed by computing device 104, and/or provided to multiple different client terminals 112 and/or different servers 110 (e.g., when the same context-prediction-component 106B-1 is used). Relevant context-specific-components 106B-2 may be provided to different client terminals 112 and/or different servers 110 according to local requirements, corresponding to the possible context outputs of the context-prediction-component 106-1. For example, one server 110 is provided a respective context-specific component 106B-2 for a "hobbies" context for use with a hobbies content creation application, and another client terminal 112 is provided a different respective context-specific-component 106B-2 for a "medical" context for writing medical articles.

Processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Data storage device 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 106 stores code 106A that implements one or more features and/or acts of the method described with reference to FIGS. 2-4 when executed by processor(s) 102, trained model code 106B that implements the trained model described herein, and/or model creation code 106C that creates model 106B.

Computing device 104 may include a data repository 116 for storing data, for example, training dataset 116A that stores the labelled text elements (labelled with a certain context) used to create model 106B, as described herein. Data repository 116 may be implemented as, for example, a memory, a local hard-drive, virtual storage, a removable storage unit, an optical disk, a storage device, and/or as a remote server and/or computing cloud (e.g., accessed using a network connection).

It is noted that storage device 106 and/or data repository 116 may be used to store other data used to train the model that are described herein in additional detail, for example, the pre-rained generic language model, embeddings of the language model used to create the clustering model, and the clusters.

Network 114 may be implemented as, for example, the internet, a local area network, a virtual private network, a wireless network, a cellular network, a local bus, a point to point link (e.g., wired), and/or combinations of the aforementioned.

Computing device 104 may include a network interface 118 for connecting to network 114, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may connect using network 114 (or another communication channel, such as through a direct link (e.g., cable, wireless) and/or indirect link (e.g., via an intermediary computing unit such as a server, and/or via a storage device) with client terminal(s) 112 and/or server(s) 110.

Computing device 104 and/or client terminal(s) 112 and/or server(s) 110 include and/or are in communication with one or more physical user interfaces 108 that include a mechanism for entering data (e.g., entering the text which is autocompleted) and/or for viewing data (e.g., viewing the autocomplete text), as described herein. Exemplary user interfaces 108 include, for example, one or more of, a touchscreen, a display, a keyboard, a mouse, and voice activated software using speakers and microphone.

Referring now back to FIG. 2, at 202, a machine learning model for context based autocomplete of text is provided and/or trained. Details of training the machine learning model are described with reference to FIGS. 3-4.

At 204, input text is received. The input text may be manually provided by a user, for example, typing using a physical and/or virtual keyboard, and/or an automated transcription of a recording of a user speaking (e.g., user speaks into a microphone, and the text is generated by a processor executing speech-to-text conversion code).

The input text may be, for example, a letter, a word, a phrase, a sentence, multiple sentences, a paragraph, and/or multiple paragraphs.

At 206, the input text is fed into a context-prediction component of the machine learning model. The context-prediction component predicts (i.e., outputs) a certain context of multiple context candidates. The context candidates may be defined, for example, by an operator during training according to implementations by the user. For example, for users using an online learning program, the contexts may relate to the topics of learning, for example, courses offered by the online learning program. In another example, for users using a technology program, the contexts may relate to specific technological fields, for example, machine learning, networks, and transport protocols. In another example, for users creating custom greeting cards, the context may relate to the occasion, for example, wedding, anniversary, birthday, and graduation.

Optionally, the context-prediction component is implemented as a neural network.

As used herein, the term neural network may refer to different suitable architectures, for example, deep neural network, fully connected neural networks, encoder-decoder architecture, chained neural networks, and/or neural networks of other suitable architectures.

Optionally, embeddings are extracted from the context-prediction component, optionally from the neural network implementation of the context-prediction component. The embeddings may be extracted as weights (and/or other representations of hidden states) from internal layers of the neural network. The embeddings may be represented as a vector.

The embedding may be mapped to one of multiple clusters. Each respective cluster corresponds to one respective context of the multiple candidate contexts. The embeddings may be mapped to one of the clusters by a clustering model that is trained using an unsupervised approach. Alternatively or additionally, each of the clusters is defined as a set of points within a multidimensional space, and/or a region defined within the multidimensional space. The embeddings are mapped to one of the clusters by plotting the embeddings as a point (e.g., the vector representation represents the set of coordinates in the multidimensional space). The selected cluster (e.g., region in the multidimensional space) corresponds to the region in the multidimensional space where the point defined by the embeddings is located. The certain context is predicted according to corresponding selected cluster. Alternatively or additionally, the certain context is predicted according to the cluster that has a shortest distance to the vector representation of the input text, i.e., the closest cluster to the point (represented by the embeddings used as coordinates) in the multidimensional space.

At 208, a certain context-specific component of the machine learning model is selected from multiple candidate context-specific components according to the certain context outputted by the context-prediction component. Each candidate context maps to one corresponding context-specific component.

At 210, the input text is fed into the selected context-specific component, which outputs the autocomplete text. The outputted autocomplete text is according to the context corresponding to the selected context-specific component.

At 212, the autocomplete text is provided, for example, presented on a display as a possible selection for the input text entered by the user. The autocomplete text may be presented, for example, using a different font, a different color, boldness of the text, underline, italics, and/or size of the text, to differentiate from the input text.

Optionally, two or more candidate autocomplete texts are presented, for example, using different colors, fonts, size, bold, underline and/or italics. Each candidate autocomplete text may represent a different possible context. The context-prediction component may predict two or more different contexts based on the input text. Two or more context-specific components are selected. Each context-specific component corresponds to one of the contexts. The input text is fed into each of the different context-specific components. Each respective context-specific components outputs a respective autocomplete text.

At 214, a selection of the autocomplete text made by the user is received. The selection may be made, for example, by clicking on the presented autocomplete text, or continuing to type the same text as the presented autocomplete text. When two or more different autocomplete texts are presented as options, the user may select one of the options. The input text may be automatically completed using the selected autocomplete text, for example, the font, font size, color, boldness, italics, underline, of the autocomplete text is changed to match the original input text.

Alternatively, the user may not select the autocomplete text. The user does not necessarily explicitly non-select the autocomplete text. Non-selection of the autocomplete text may be implied, for example, when the user continues to enter additional input text (e.g., typing) which may be different than the presented autocomplete text.

At 216, one or more features described with reference to 204-214 are iterated. The iterations may be dynamically performed for additional received input text. The additional received input text may be a continuation of the previously entered input text (e.g., when the user has not yet selected the autocomplete text) and/or may represent new input text (e.g., when the user has previously selected the autocomplete text). The context and/or autocomplete text may be dynamically adapted according to the additional received input text and/or according to the new input text.

Referring now back to FIG. 3, at 302, a training dataset is received and/or created. The training dataset includes multiple text elements, where each text element is associated with a label of a certain context. The set of all contexts used to label the text elements represent the set of candidate contexts.

Each text element may include, for example, a letter, a word, a phrase, a sentence, multiple sentences, a paragraph, and/or multiple paragraphs.

The text elements may be semi-structured metadata.

The labels may be manually defined, for example, by a user. Alternatively or additionally, the labels may be automatically extracted from the semi-structured metadata, for example, using a label extraction machine learning model trained on a training dataset of text and associated labels.

At 304, a context-prediction component of the machine learning model is trained, using the training dataset, for predicting a certain context of the set of candidate contexts in response to being fed input text. The context-prediction component may be trained using the full set of multiple text elements labelled with the full set of candidate contexts.

The context-prediction component may be implemented as a multi-category classifier, which is capable of classifying input text into one of multiple context categories. Alternatively, multiple context-prediction components may each be implemented as a single-category classifier that outputs an indication of whether the input text is classified into one respective context category or not. Each classifier is trained using text labelled with one context. In such implementation, the text may be fed into all of the context-prediction components to determine which context(s) the text is classified into.

At 306, multiple context-specific components of the machine learning model are trained. Each respective context-specific component corresponds to a respective context of the multiple candidate contexts. Each context-specific component is trained for outputting autocomplete text of the corresponding context when fed the input text.

Each respective context-specific component may be trained using the subset of text elements labelled with the context label corresponding to the context of the respective context-specific component. For example, a full sentence represents ground truth, and the first several words of the sentence represent the input text. Each context-specific component learns to complete the input text to obtain the full sentence.

At 308, the model is provided for outputting autocomplete text when fed input text. For example, the model may be stored, executed, and/or forwarded to another computing device.

Referring now back to FIG. 4, at 402, a training dataset of context labelled text elements is provided, for example, as described with reference to 302 of FIG. 3.

At 404, a pre-trained generic language model is created. The language model may be implemented, for example, as a neural network.

The pre-trained generic language model may output generic autocomplete text, without consideration of context. The generic language model may be pre-trained on generic text, which may be text that is different than the text of the training dataset. The generic text is not labelled with an indication of context. Examples of genetic text include: online encyclopedias that include articles of a variety of different topics, news sites text data, and/or social network sites on which users post content.

The pre-trained generic language model may be created from scratch, for example, the weights of neurons in the neural network model are initially set to random numbers. The pre-training of the language model stores an adjustment of the random numbers. The initial random numbers are no longer random after the generic language model is pre-trained. In one example, the initial language model is pre-trained by being fed a sequence of a selected number of words in a sentence and/or paragraph, where the language model tries to predict (i.e. autocompletes) the next word. In another example, the initial language model is pre-trained by being fed a sentence where a few of the words are covered, where the language model tries to predict what the covered words are.

At 406, a language model is created from the pre-trained generic language model. The generated language model may be used as the context-prediction component of the model described herein.

The language model may be created by fine tuning the pre-trained generic language model on the text elements and associated labels of the training dataset. It is noted that the initial weights of the pre-trained generic language model are not the random values initially assigned to the weights, but are adjusted based on the initial training (i.e., the pre-training). The fine tuning of the pre-trained generic language model may be performing by further training the pre-trained generic language model (which has been trained on generic text) using the training dataset. The fine tuning may be performed, by additional training of the pre-trained generic language model, for example, using a similar training process used to pre-train the scratch initialized generic language model (e.g., as described herein) and/or using another training process.

At 408, a clustering model for predicting clusters is created. Each predicted cluster corresponds to one context of the set of contexts used to label the text elements of the training dataset. The cluster model may be used as the context-prediction component of the model described herein.

The clustering model is created using embeddings of the language model. The embeddings are extracted from hidden layer(s) of the neural network implementation of the language model, for example, as weights of neurons of the hidden layer, optionally represented as a vector, for example, as described herein.

Optionally, the clustering model is created using an unsupervised approach that learns to cluster the embeddings.

At 410, multiple context-specific components are trained. Each respective context-specific component corresponds to one context, i.e., to one cluster corresponding to one context.

Each context-specific component may be trained using a subset of the training dataset that includes text elements associated with the label of the respective context corresponding to the respective context-specific component.

Each respective context-specific component may be trained by fine tuning the pre-trained generic language model described herein. An instance of the same pre-trained generic language model may serve as the starting point for training each respective context-specific component. The fine tuning may be performed as described herein using the process described with reference to 406.

Figure 5:
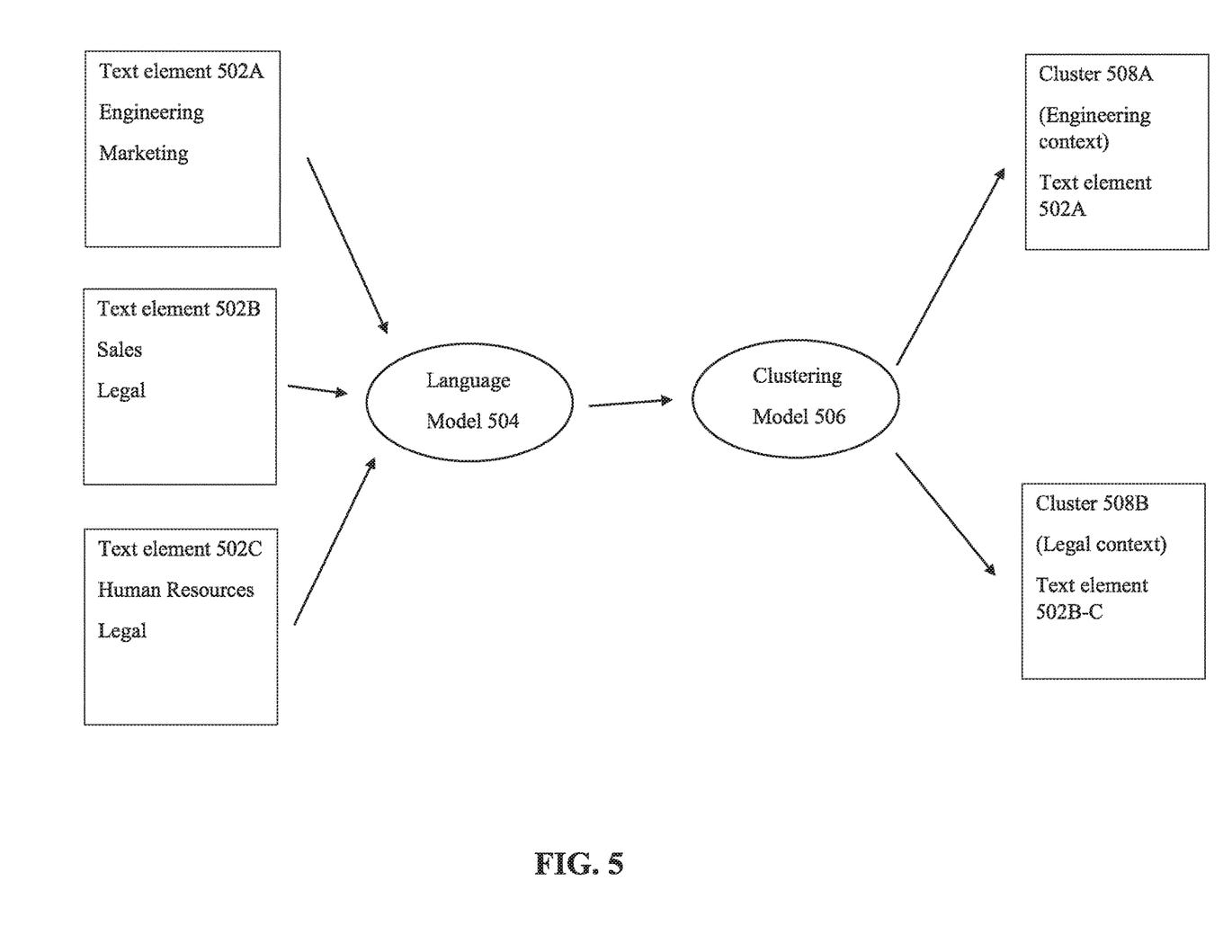
FIG. 5 is a dataflow diagram depicting an exemplary dataflow for creating clusters each representing a corresponding context for creating the context-prediction component of the model, in accordance with some embodiments.

Reference is now made to FIG. 5, which is a dataflow diagram depicting an exemplary dataflow for creating clusters each representing a corresponding context for creating the context-prediction component of the model, in accordance with some embodiments. Text elements 502A-C, including text of multiple contexts, are provided. For example, text-element 502A includes text associate with the contexts of engineering and marketing, text-element 502B includes text associate with the contexts of sales and legal, and text-element 502C includes text associate with the contexts of human resources and legal. Text elements 502A-C are fed into a language model 504 (e.g., created as described herein). Embeddings are extracted from hidden states (e.g., weights) of hidden labels of a neural network implementation of language model 504. Each respective embedding is extracted after each respective text element 502A-C is fed into language model 504 and processed. The embeddings (i.e., one embedding for each of text elements 502A-C) are fed into clustering model 506. Clustering model 506 clusters the embeddings using an unsupervised approach to create clusters 508A-B. Each cluster corresponds to one context. For example, cluster 508A, which includes embeddings of text element 502A, represents the context "Engineering", and cluster 508B, which includes embeddings of text element 502B-C represents the context "Legal".

In another example, TextElement1 in "Sale" section with the label "legal" and TextElement2 in "Engineering" section with label "GDPR" may be clustered into the same context. TextElement3 in "Engineering" section with label "AI" and TextElement4 in "Data Science" section with label "Deep Learning" may be clustered into the same learning context.

It is noted that three text elements and two clusters are only shown for simplicity and clarity of explanation. There may be a large number of text elements and many clusters created according to the number of contexts.

Referring now back to FIG. 4, at 412, the model, which includes the trained context-prediction component (i.e., the language model and/or cluster component) and the multiple trained context-specific components, is provided, for example, as described with reference to 308 of FIG. 3.

Various embodiments and aspects as delineated hereinabove and as claimed in the claims section below find computed support in the following examples.

EXAMPLES

Reference is now made to the following examples, which together with the above descriptions illustrate some embodiments in a non limiting fashion.

In the following examples, the term "prompt" denotes the input text, the term "actual" denotes the actual fully completed text serving as ground truth, the term "No Finetune" represents the autocomplete text generated by a non-context aware model such as an existing generic model, and the term "Finetuned" represents autocomplete text generated from the context-aware model as described herein.

Example 1

[prompt]:People must request to join⇒

- - - - - - - - - -

[actual]:People must request to join a private group. Only group members can po

- - - - - - - - - -

[No Finetune]:People must request to join the group. "We are not going to be a group!

- - - - - - - - - -

[Finetuned]:People must request to join the group. The group must be a nonprofit, educational institution, or!

Example 2

[prompt]:But keep the group as small⇒
----------
[actual]:But keep the group as small as possible. You don't want too many cooks
----------
[No Finetune]:But keep the group as small as possible. The group is not a "group of!
----------
[Finetuned]:But keep the group as small as possible. If you want to make it a permanent group,!
==============================

Example 3

[prompt]:You can group and filter on⇒
----------
[actual]:You can group and filter on dimension fields. Analytics doesn't usuall
----------
[No Finetune]:You can group and filter on the fly. The following is a list of the most!
----------
[Finetuned]:You can group and filter on the basis of a single value. For example, you can group!
==============================

Example 4

[prompt]:In the next sections and ⇒
----------
[actual]:In the next sections and following units, we walk through setting up a
----------
[No Finetune]:In the next sections and sections, we will discuss the various ways in which the system works.!
----------
[Finetuned]:In the next sections and sections, you'll learn how to create a custom object and!
==============================

Example 5

[prompt]:We show you how these⇒
----------
[actual]:We show you how these incredibly talented people have shaped business
----------
[No Finetune]:We show you how these two are able to create a new world, and how they can create!
----------
[Finetuned]:We show you how these two components can be used together to create a single, unified view of!
==============================

Example 6

[prompt]:Nested within the ⇒
----------
[actual]:Nested within the RecordViewer.js component, RecordSection.js and Reco
----------
[No Finetune]:Nested within the same group, the results are similar.
The researchers found that the!
----------
[Finetuned]:Nested within the same org. For example, if you have a custom object that contains a!
==============================

Example 7

[prompt]:Click New.Give the record⇒
----------
[actual]:Click New.Give the record any name, and fill out all fields with val
[No Finetune]:Click New. Give the record a try.
----------
The record is now available for download.!
----------
[Finetuned]:Click New. Give the record a name and description. Click Save. Create a new record.!
==============================

Example 8

[prompt]:If you like getting your⇒
----------
[actual]:If you like getting your hands dirty with APIs, you can do that, and w
----------
[No Finetune]:If you like getting your hands dirty, you can always buy a new one.
The!
----------
[Finetuned]:If you like getting your hands dirty, you can use the Salesforce CLI to create a new!
==============================

Example 9

[prompt]:So, work that comes through⇒
----------
[actual]:So, work that comes through the Cases queue is less urgent than the Hi
----------
[No Finetune]:So, work that comes through the door is a good thing.
The first thing you!
----------
[Finetuned]:So, work that comes through the console. Click the App Launcher and select Sales. Click the!
==============================

Example 10

[prompt]:And when users create data⇒
----------
[actual]:And when users create data using that object, that data is also immedi
----------
[No Finetune]:And when users create data, they are often asked to create a new data set. This is!
----------
[Finetuned]:And when users create data, they're interacting with the data in a way that?!

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models will be developed and the scope of the term machine learning model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A computer implemented method of context based autocomplete of text, comprising:
    in an inference phase of an operation of autocomplete of text:
        receiving input text;
        feeding the received input text into a context-prediction component of a machine learning model;
        identifying a context associated with said input text from a plurality of predefined contexts, by analyzing said input text by said context-prediction component that selects said context out of said plurality of pre-defined contexts;
        selecting a context-specific component from a plurality of context-specific components according to the identified context, wherein each of said context-specific components is trained to generate autocompleted text, said training of each of the plurality of context-specific components is conducted by initially using generic text and then improving each respective context-specific component by re-training using text associated with a specific context, said specific context is different for each of the plurality of context-specific components and corresponds to one of the plurality of pre-defined contexts;
        feeding said received input text to the selected context-specific component;
        generating autocomplete text associated with the identified context, wherein said autocomplete text is outputted by said selected context-specific component; and
        providing the autocomplete text.

2. The method of claim 1, wherein the receiving, feeding the text into the context-prediction component, the selecting, the feeding the text into the selected context-specific component, and the providing, are dynamically iterated for additional received text, wherein the context is dynamically adapted according to the additional received text.

3. The method of claim 1, wherein when the context-prediction component predicts at least two different contexts of the plurality of contexts, at least two context-specific components are selected according to the at least two different contexts, the input text is fed into each one of the at least two different context-specific components that output respective autocomplete text, and at least two different autocomplete texts outputted by the context-specific components are presented on a display for selection of one of the at least two different autocomplete texts for completion of the input text.

4. The method of claim 1, further comprising:

extracting embeddings from the context-prediction component of the machine learning model fed the input text;

mapping the embeddings to one of a plurality of clusters, each respective cluster denoting one respective context of the plurality of contexts, wherein the context is predicted according to the respective cluster.

5. The method of claim 4, wherein the context-prediction component is implemented as a neural network, wherein the embeddings are represented as a vector and extracted as hidden states from internal layers of the neural network, wherein each of the plurality of clusters is defined as points within a multidimensional space, and the context is predicted according to the cluster that has a shortest distance to the vector representation of the input text.

6. The method of claim 4, wherein the embeddings are mapped to one of the plurality of clusters by a clustering model that is trained using an unsupervised approach.

7. A computer implemented method of training a machine learning model for context based autocomplete of text, comprising:

training a context-prediction component of the machine learning model to identify during an inference phase of an operation of autocomplete of text, a context associated with input text inputted to said context-prediction component, said identifying said context is by analyzing said input text by said context-prediction component that selects said context out of a plurality of predefined contexts;

training a plurality of context-specific components of the machine learning model, each respective context-specific component is trained to generate and output, during said inference phase of said operation of autocomplete of text, in response to said input text inputted to said respective context-specific component, autocompleted text associated with a corresponding respective context pre-defined for the respective context-specific component; and providing the model for outputting autocomplete text when fed input text during said inference phase of said operation of autocomplete of text.

8. The method of claim 7, further comprising:

receiving a plurality of text elements, each text element associated with a label of a context of the plurality of contexts; and wherein training each respective context-specific component of the plurality of context-specific components is performed using text elements associated with the label of the respective context corresponding to the respective context-specific component.

9. The method of claim 8, wherein each respective context-specific component of the plurality of context-specific components is trained by fine tuning a common pre-trained generic language model trained on generic text, with respective text elements associated with the label of the respective context corresponding to the respective context-specific component.

10. The method of claim 7, further comprising:

receiving a plurality of text elements, each text element associated with a label of a context of the plurality of contexts; and training a language model on the plurality of text elements and associated labels, wherein the language model is used for the context-prediction component.

11. The method of claim 10, wherein the plurality of text elements are semi-structured metadata, and the labels are automatically extracted from the semi-structured metadata using a label extraction machine learning model trained on a training dataset of text and associated labels.

12. The method of claim 10, wherein the language model comprises a pre-trained generic language model trained on generic text that is unlabeled with an indication of context, and the language model is trained by fine tuning the pre-trained generic language model on the plurality of text elements and associated labels indicative of context.

13. The method of claim 12, further comprising using embeddings of the language model to create a clustering model for predicting clusters using an unsupervised approach that learns to cluster the embeddings, wherein each cluster indicates a respective context of the plurality of contexts, and using the cluster model for the context-prediction component.

14. A system for context based autocomplete of text, comprising:

at least one hardware processor executing a code for conducting an operation of autocomplete of text in an inference phase, said code comprising:

code for receiving input text;

code for feeding the received input text into a context-prediction component of a machine learning model;

code for identifying a context associated with said input text from a plurality of predefined contexts, by analyzing said input text by said context-prediction component that selects said context of said plurality of pre-defined contexts;

code for selecting a context-specific component from a plurality of context-specific components according to the identified context, wherein each of said context-specific components is trained to generate autocompleted text, said training of each of the plurality of context-specific components is conducted by initially using generic text and then improving each respective context-specific component by re-training using text associated with a specific context, said specific context is different for each of the plurality of context-specific components and corresponds to one of the plurality of pre-defined contexts;

code for feeding said received input text to the selected context-specific component;

code for generating autocomplete text associated with the identified context, wherein said autocomplete text is outputted by said selected context-specific component; and code for providing the autocomplete text.

15. The system of claim 14, wherein the code further comprising code for:

training the context-prediction component of the machine learning model for predicting the context associated with input text inputted to said context-prediction component, said predicting is by identifying said context within a plurality of predefined contexts; and training the plurality of context-specific components of the machine learning model, each respective context-specific component is trained to generate and output, in response to said input text inputted to said respective context-specific component, autocompleted text associated with a corresponding respective context predefined for the respective context-specific component.

\* \* \* \* \*